(12) United States Patent
Toner

(10) Patent No.: US 11,231,056 B2
(45) Date of Patent: Jan. 25, 2022

(54) CLIP AND MOUNTING SYSTEM

(71) Applicant: SynergyWiz, Inc., Saint Petersburg, FL (US)

(72) Inventor: Stephen John Toner, Tampa, FL (US)

(73) Assignee: SynergyWiz, Inc., Saint Petersburg, FL (US)

( * ) Notice: Subject to any disclaimer, the term of this patent is extended or adjusted under 35 U.S.C. 154(b) by 16 days.

(21) Appl. No.: 17/004,820

(22) Filed: Aug. 27, 2020

(65) Prior Publication Data

US 2021/0062836 A1    Mar. 4, 2021

Related U.S. Application Data

(60) Provisional application No. 62/705,018, filed on Jun. 7, 2020, provisional application No. 62/894,737, filed on Aug. 31, 2019.

(51) Int. Cl.
| | |
|---|---|
| *A47B 96/00* | (2006.01) |
| *F16B 2/22* | (2006.01) |
| *F16B 11/00* | (2006.01) |
| *H04M 1/725* | (2021.01) |
| *H04B 1/3877* | (2015.01) |

(Continued)

(52) U.S. Cl.
CPC .............. *F16B 2/22* (2013.01); *F16B 11/006* (2013.01); *F16M 13/02* (2013.01); *H04B 1/3877* (2013.01); *H04B 1/3888* (2013.01); *H04M 1/725* (2013.01)

(58) Field of Classification Search
CPC ......... F16B 2/22; F16B 11/006; F16M 13/02; H04B 1/3877; H04B 1/3888; H04M 1/725

USPC ...... 248/205.4, 222.11, 222.12, 560, 220.21, 248/220.22, 221.11, 205.1; 455/575.1; 403/321, 322.1, 325, 328, 345, 373
See application file for complete search history.

(56) References Cited

U.S. PATENT DOCUMENTS

| | | | |
|---|---|---|---|
| 4,317,263 A * | 3/1982 | Fohl ................... | A44B 11/2511 24/635 |
| 8,572,820 B2 | 11/2013 | Richards | |

(Continued)

FOREIGN PATENT DOCUMENTS

FR         3033065         4/2018

OTHER PUBLICATIONS

AustriAlpin GmbH, Product Demonstration, https://austrialpin.net/product-demonstration/, The publication date is Feb. 12, 2020.

*Primary Examiner* — Todd M Epps
(74) *Attorney, Agent, or Firm* — Larson & Larson, P.A.; Frank Liebenow; Justin P. Miller

(57) ABSTRACT

A mounting system includes a male portion and a female portion, each for attaching to one of two different objects (e.g. devices, accessories, walls). In one embodiment, each of the portions are produced entirely by one-piece injection molding. The male portion is substantially planar and has concave indentation or detent areas. The female section has a planar back side and inwardly facing walls on each side forming a channel. One or both sides has an extension member that is spring biased such that as the male portion is slid into the female portion, the extension member moves into the concave indentation or detent areas to hold the male member in the channel until sufficient force is exerted in an opposite direction to overcome the spring bias and slide the male section out of the channel of the female section.

20 Claims, 5 Drawing Sheets

(51) Int. Cl.
*H04B 1/3888* (2015.01)
*F16M 13/02* (2006.01)

(56) References Cited

U.S. PATENT DOCUMENTS

| | | |
|---|---|---|
| 8,899,411 B2 | 12/2014 | Van Geer |
| 9,423,671 B2 | 8/2016 | O'Neill et al. |
| 9,611,881 B2 * | 4/2017 | Khodapanah ........ F16M 11/041 |
| 9,700,145 B1 * | 7/2017 | Wang ..................... A47C 7/546 |
| 10,238,184 B2 * | 3/2019 | Moran ............... A44B 11/2573 |
| 10,782,596 B2 * | 9/2020 | Wilson ................... F16M 13/02 |
| 2005/0232413 A1 | 10/2005 | Tages et al. |
| 2012/0050968 A1 | 3/2012 | Child et al. |
| 2014/0360893 A1 | 12/2014 | Whitten et al. |
| 2015/0286117 A1 * | 10/2015 | Sung .................... F16M 11/041 224/191 |
| 2019/0154190 A1 | 5/2019 | Yun |

* cited by examiner

CLIP AND MOUNTING SYSTEM

CROSS-REFERENCE TO RELATED APPLICATION

This application claims the benefit of U.S. provisional applications No. 62/894,737 filed on Aug. 31, 2019 and 62/705,018 filed on Jun. 7, 2020, the disclosure of both are incorporated by reference.

FIELD

This invention relates to the field of mounting clips for devices such as cellphones and more particularly to an interlocking system to physically connect a device to another object.

BACKGROUND

Devices such as cellphones, tablet computers, and music players are usually quite thin as users prefer a device that will fit in their hand, pocket, purse, etc. These users do not prefer to add any type of thick attachment mechanisms to their cellphones, other than maybe a protective case or screen protector.

Unfortunately, there are times when a user wants to attach one or more objects to their cellphone or cellphone case. For example, many people have holding devices attached to the back of their cellphone or cellphone case to make it easier to hold their cellphone during calls and to tilt their cellphone while watching a video, etc. Many people have metal discs affixed to the back of their cellphone or cellphone case to removably hold their cellphone to a magnetic holder, for example, when driving. For most applications such as these, the object (cellphone holder, metal disc, etc.) is affixed to the back of the cellphone or cellphone case, usually by an adhesive pad. This seems to work well for many users, but is very limiting.

Another issue that is surfacing with such devices is wireless charging. To date, many devices are equipped to wirelessly charge by placing the device face up on a charging surface. Electronics beneath the charging surface emit electromagnetic energy that is received by the device and converted into proper voltages and currents to charge batteries of the device. As one might imagine, it would be difficult to use the device as it lays face up on the charging station, especially for making phone calls. In the past, many devices that include wireless charging also include a power connector for wired charging, but several newer devices support only wireless charging, eliminating the charging connector which is a weak point in the reliability of the device as well as a location for intrusion of liquids. This makes it indeed difficult for a user of such a device to make a phone call if the battery power is low as, in the past, they would have connected a power cable to the device, but the new technology does not permit such a connection.

If the user wishes to temporarily attach an accessory to their device, some use an adhesive to adhere such accessories to cellphone or cellphone case. Unfortunately, the adhesive makes it difficult to separate the accessories from the device (e.g. cellphone or cellphone case), possibly damaging the cellphone or cellphone case during an attempt to remove the accessory or, at the least, leaving behind an adhesive residue that is difficult to remove. This renders it almost impossible to use an adhesive connection mechanism when the user wishes to remove and replace the device or another device, especially if such replacement occurs repetitively.

Another issue with having such accessories semi-permanently adhered to the back of a cellphone or cellphone case is interference with wireless charging. For example, an accessory that is a metal disc attenuates the wireless charging signal to a point where little or no charging occurs. Further, thicker connecting devices separate the accessories at a distance from the back of the cellphone or cellphone case, too far away for charging.

What is needed is a mounting system that will provide a temporary mounting connection between a device and an accessory.

SUMMARY

In one embodiment, a mounting system for removably connecting a device to an accessory is disclosed. The mounting system includes a male portion and a female portion. The male portion has two opposing sides, each of the opposing sides have an edge shelf and at least one of the opposing sides has a detent area. The female portion has a top edge, a bottom edge, a front, a back, side edges, and a channel formed between two inwardly facing walls of the side edges. Each inwardly facing wall has a guide for retaining a corresponding edge shelf of the male portion. At least one inwardly facing wall has an extension member that is inwardly spring-biased such that after sliding the male portion into the channel of the female portion, the extension member of the female portion moves into the detent area of the male portion, thereby holding the male portion within the female portion until acted upon by a force of sliding the male portion out of the channel of the female portion.

In another embodiment, a mounting system for removably connecting a device to an accessory is disclosed. The mounting system includes a male portion and a female portion. The male portion has two opposing sides, each of the opposing sides with an edge shelf and having a detent area. The female portion has a top edge, a bottom edge, a front, a back, side edges, and a channel formed between two inwardly facing walls of the side edges. Each inwardly facing wall has a guide for retaining a corresponding edge shelf of the male portion and has two extension members that are inwardly spring-biased by springs that are molded into the female portion by way of flexing arms that are interfaced to the female portion at inflection points forming the springs. After sliding the male portion into the channel of the female portion, the extension members of the female portion pushes into the detent areas of the male portion, thereby holding the male portion within the female portion until acted upon by a force of sliding the male portion out of the channel of the female portion.

In another embodiment, a mounting system for removably connecting a device to an accessory is disclosed. The mounting system includes a planar male portion and a female portion. The planar male portion has two opposing sides, each of which have an edge shelf and a detent area. The female portion has a top edge, a bottom edge, a front, a planar back surface, side edges, and a channel formed between two inwardly facing walls of the side edges. Each inwardly facing wall has a guide for retaining a corresponding edge shelf of the male portion and each inwardly facing wall has an extension member that is interfaced to flexing arms that are interfaced to the female portion at inflection points. In some embodiments, there is a back stop on the top edge of the female portion for preventing the male portion from exiting the female portion at the top edge of the female portion. After sliding the male portion into the channel of the female portion, the extension members of the female portion push into the detent areas of the male portion by way of bias provided by the flexing arms, thereby holding the male portion within the female portion until acted upon by a force of sliding the male portion out of the channel of the female portion.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
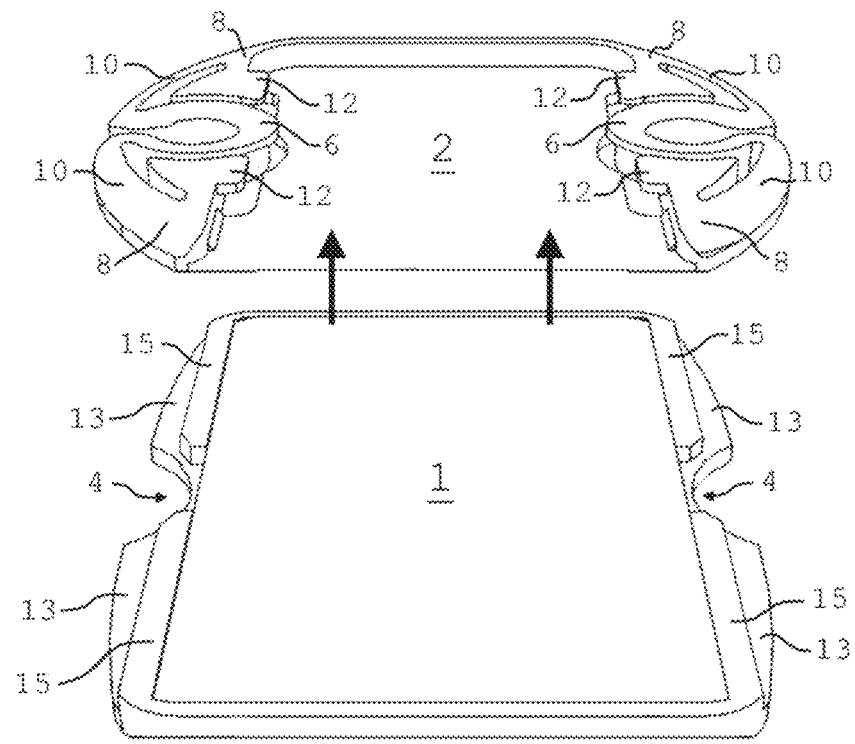
FIG. 1 illustrates a perspective view of a mounting system showing two parts (male and female) ready to engage.

Reference will now be made in detail to the presently preferred embodiments of the invention, examples of which are illustrated in the accompanying drawings. Throughout the following detailed description, the same reference numerals refer to the same elements in all figures.

Throughout this description, exemplary devices and accessories are used for demonstrative purposes and in no way limit the present invention to any particular device or accessory. In general, a cellular phone with or without a case is used as an example of such devices.

Likewise, a wireless charging module is used as an example of an accessory, though there is no limit as to the types of accessories anticipated. Examples of other accessories include, but are not limited to, a metal disk (for magnetically holding the device), a phone holder, etc. Further, in some embodiments, the disclosed mounting system removably holds a device to a fixed object such as a wall or desk.

Referring to FIGS. 1-4 perspective views of a mounting system are shown in which two parts (male portion 1 and female portion 2) are in various positions of engagement. As is shown in the progression between FIG. 1 through FIG. 4, the male portion 1 slides into the female portion 2 and thereafter, the male portion 1 is held within a channel of the female portion 2 by spring force of one or more spring mechanisms 6/8/10, although it is fully anticipated that there be only one spring mechanism 6/8/10 or two spring mechanisms 6/8/10. The channel of the female portion 2 is formed by inwardly facing walls 11 and a stop 17.

It is preferred that front and back surfaces of the male portion 1 be substantially planar so as to slide into the female portion 2 and not add to the thickness above that of the female portion 2. In embodiments in which the mounting system is adhered to surfaces of the devices and/or accessories, each of the male portion 1 and female portion 2 have bottom surfaces that are substantially planar for mounting using, for example, an adhesive or double-sided adhesive tape. Each of the male portion 1 and female portion 2 have side edges, a top edge, a bottom edge, a back surface and a front surface, the front facing away from the device 50 or accessory 52 into which the male portion 1 or female portion 2 is attached/formed. In embodiments in which the male portion 1 and/or female portion 2 are attached to the device 50 or accessory 52, the male portion 1 and female portion 2 have back surfaces that are preferably planar for bonding with the device 50 or accessory 52.

Figure 2:
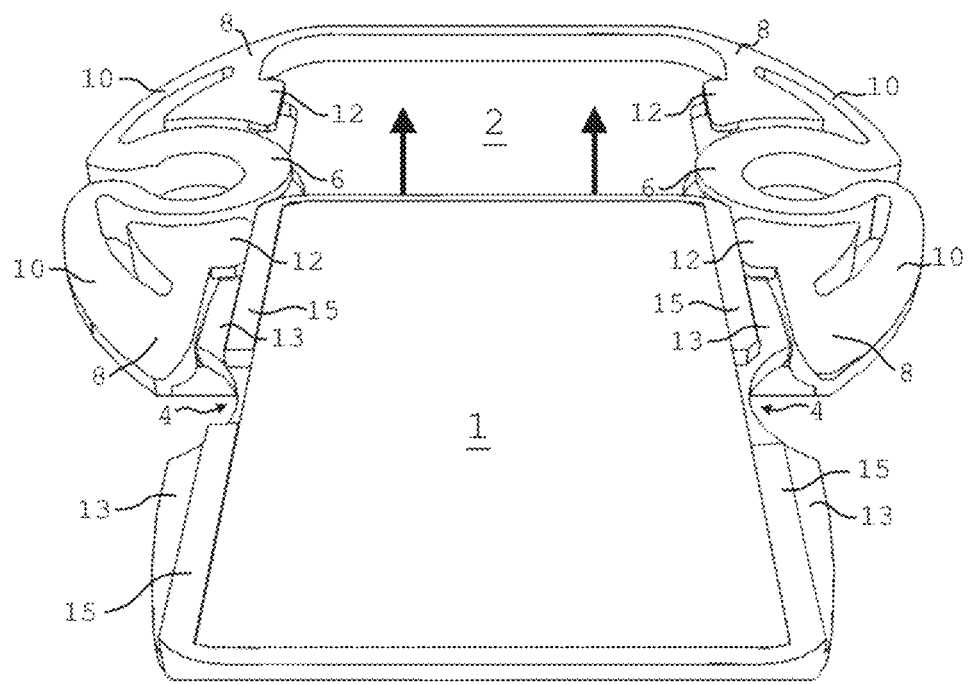
FIGS. 2 and 3 illustrate perspective views of the mounting system showing two parts partially engaged.
Figure 3:
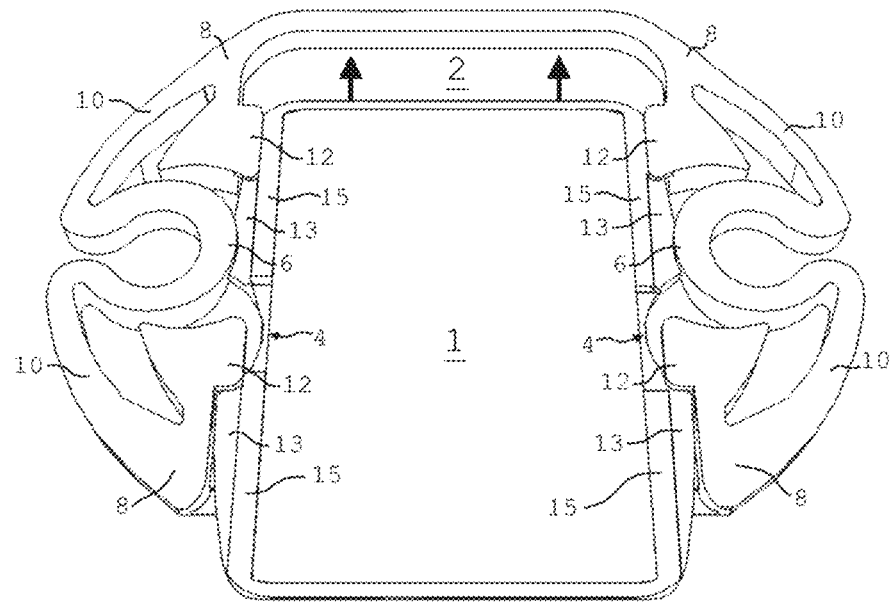
Figure 4:
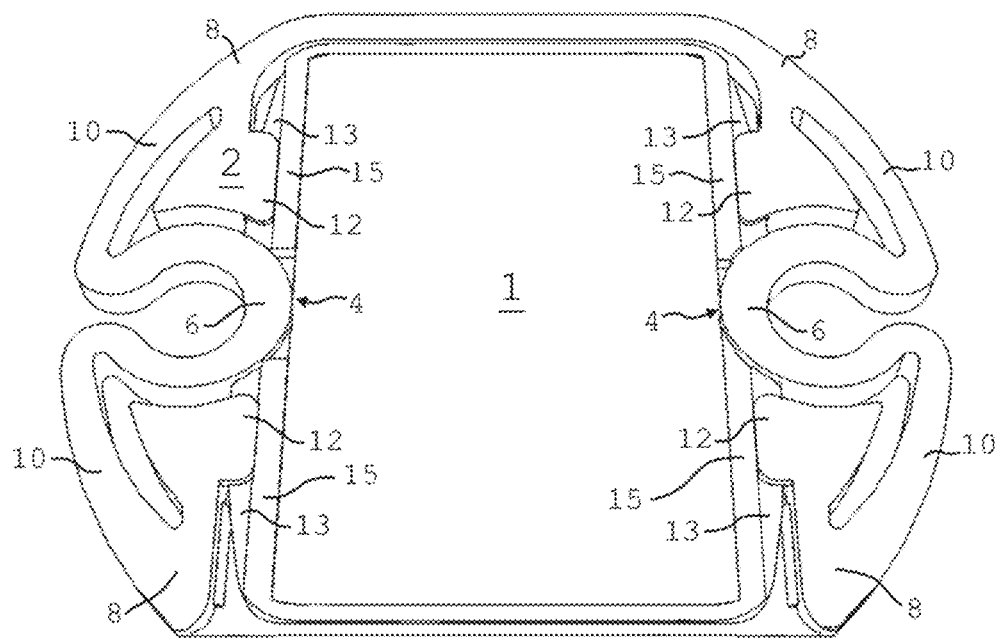
FIG. 4 illustrates a perspective view of the mounting system showing two parts engaged.

The concept is to provide the mounting system with minimal thickness while providing sufficient connection maintaining force by spring bias of the one or more spring mechanisms 6/8/10. In one embodiment, the one or more spring mechanisms 6/8/10 are formed as part of the female portion 2 by way of a molded spring as shown in FIGS. 1-4. In this, the one or more spring mechanisms 6/8/10 are formed into or with the female portion 2 during molding or fabrication. As is visible in FIGS. 1-4, the one or more spring mechanisms 6/8/10 have an extension member 6 connected to flexing arms 10 for providing the spring action that, in turn, interfaces to the female portion 2 at inflection points 8. As the male portion 1 is inserted into the female portion 2, a side edge 15 of the male portion 1 first contacts the extension member 6 (as shown in FIG. 2), then pushes the extension member 6 of each of the spring mechanisms 6/8/10 outwardly as shown in FIG. 3 until a detent area 4 of the male portion 1 aligns with the extension member 6 of each of the spring mechanisms 6/8/10, at which time, the extension member 6 of each of the spring mechanisms 6/8/10 is pushed into the detent area 4 of the male portion 1 by the flexing arms 10 as shown in FIG. 4. The extension member 6, being spring-biased, holds the male portion 1 firmly within the female portion 2 until sufficient force is exerted in the opposing direction of FIGS. 1-4, sufficient enough to cause the extension member 6 of each of the spring mechanisms 6/8/10 to retract far enough so that extension member 6 of each of the spring mechanisms 6/8/10 leaves the detent area 4 of the male portion 1, allowing the male portion 1 to be slid out of the female portion 2.

To prevent the male portion 1 from lifting off of the female portion 2 when engaged, an edge shelf 13 slides beneath guides 12, holding the male portion 1 flatly against the female portion 2 when engaged.

By constructing the male portion 1 and the female portion 2 as described and shown, in some embodiments both the male portion 1 and the female portion 2 are fabricated from injection molded plastic, though as will be discussed, in some embodiments, one or both of the male portion 1 and the female portion 2 are manufactured into either the device 50 (see FIG. 9) or the accessory 52 (see FIG. 10).

Figure 5:
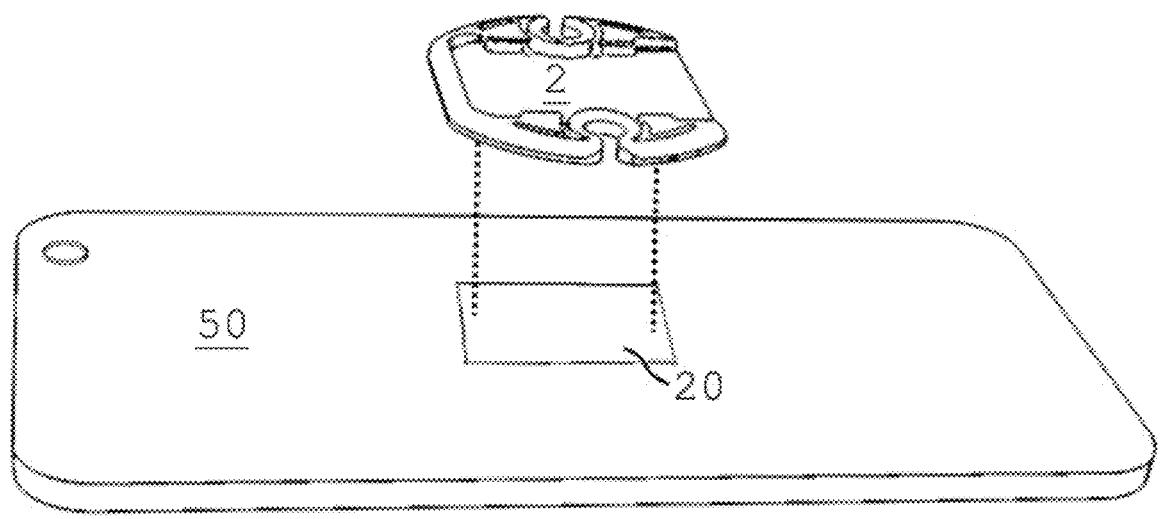
FIG. 5 illustrates a perspective view of a female portion of the mounting system being affixed to a device.

FIG. 5 illustrates a perspective view of a female portion 2 of the mounting system being affixed to a device 50. In this example, a two-sided adhesive tape 20 is used, one side of the two-sided adhesive tape 20 adheres to the device 50 and the opposing side of the two-sided adhesive tape 20 adheres to the female portion 2 (or male portion 1 if desired). Any type of adhesive is anticipated and any size and shape of two-sided adhesive tape 20 is anticipated, including a two-sided adhesive tape 20 that conforms to the outline of the female portion 2 (or male portion 1). In some embodiments, the female portion 2 and/or the male portion 1 is provided with two-sided adhesive tape 20 already attached, for example, having a protective shield to protect the two-sided adhesive tape 20 until it is placed against the device 50 (or device case).

Figure 6:
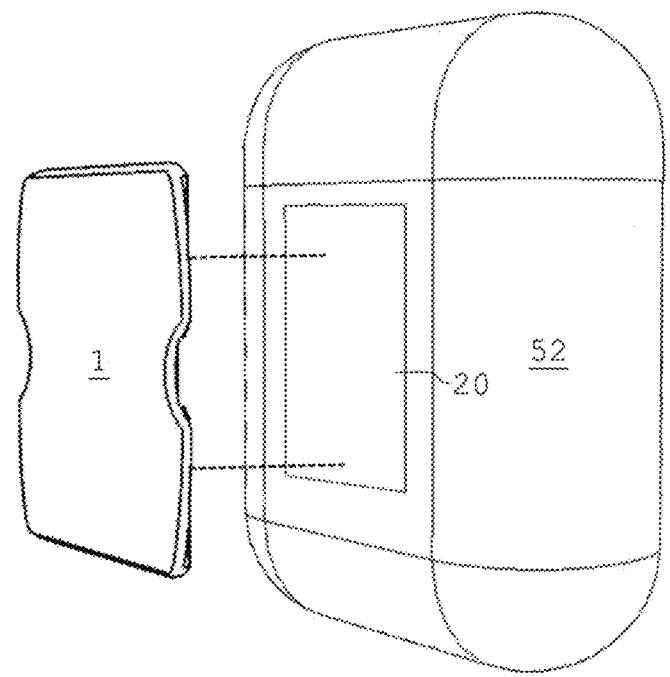
FIG. 6 illustrates a perspective view of a male portion of the mounting system being affixed to an accessory.

FIG. 6 illustrates a perspective view of a male portion 1 of the mounting system being affixed to an accessory 52, in this example, a wireless device charger. In this example, a two-sided adhesive tape 20 is used, one side of the two-sided adhesive tape 20 adheres to the accessory 52 and the opposing side of the two-sided adhesive tape 20 adheres to the male portion 1 (or female portion 2 if desired). Any size and shape of two-sided adhesive tape 20 is anticipated, including a two-sided adhesive tape 20 that conforms to outer shape of the male portion 1 (or female portion 2). In some embodiments, the female portion 2 and/or the male portion 1 is provided with two-sided adhesive tape 20 already attached, for example, having a protective shield to protect the two-sided adhesive tape 20 until it is placed against accessory 52.

Note that it is fully anticipated to attach the female portion 2 or the male portion 1 to any device 50 or accessory 52 using any adhesion system, including, but not limited to, two-sided tape, glue, epoxy glue, ultrasonic welding, etc. As will be shown, it is also anticipated to integrate the female portion 2 and/or the male portion 1 into the device 50 or accessory 52.

Figure 7:
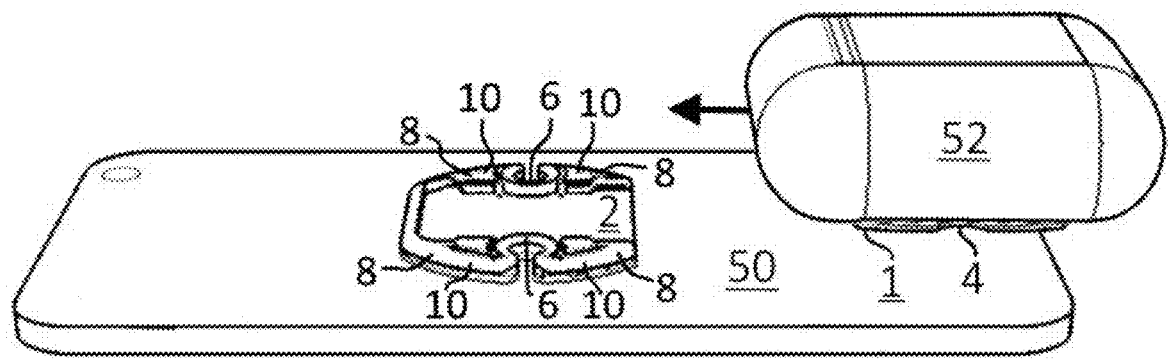
FIG. 7 illustrates a perspective view of a female portion of the mounting system affixed to a device and the accessory (including the male portion of the mounting system, though not visible) being connected.

FIG. 7 illustrates a perspective view of a female portion 2 of the mounting system affixed to a device 50 and the accessory 52 (including the male portion 1 of the mounting system, though not visible) being connected. Once connected, the extension member 6 of the one or more spring mechanisms 6/8/10 of the female portion 2 exerts pressure inwardly, into the detent area 4 of the male portion 1, thereby retaining the accessory 52 attached to the device 50 until sufficient force is applied in an opposing direction to cause the extension member 6 of the one or more spring mechanisms 6/8/10 of the female portion 2 to retract and exit the detent area 4 of the male portion 1, thereby releasing the accessory 52 from the device 50. Although shown attaching the male portion 1 to the accessory 52 and the female portion 2 to the device 50, it is equally anticipated to attach the male portion 1 to the device 50 and the female portion 2 to the accessory 52.

Figure 8:
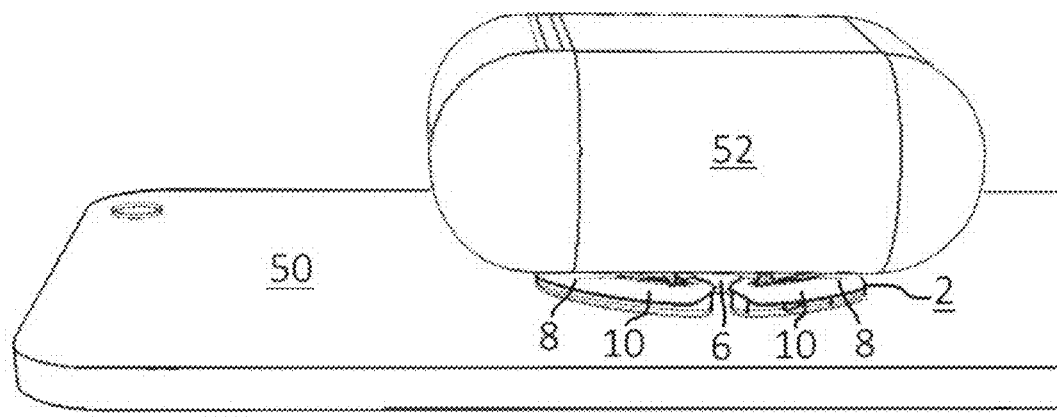
FIG. 8 illustrates a perspective view of a female portion of the mounting system affixed to a device and the accessory (including the male portion of the mounting system, though not visible) after being connected.

FIG. 8 illustrates a perspective view of a female portion 2 of the mounting system affixed to a device 50 and the accessory (including the male portion 1 of the mounting system, though not visible) after being connected. In this view, the accessory 52 is held to the device 50 by spring force of the one or more spring mechanisms 6/8/10 exerting pressure of on the extension member 6 of the female portion 2 into the detent area 4 of the male portion 1. The mounting system will retain the accessory 52 attached to the device 50 until sufficient force is applied in a disengaging direction to cause the extension member 6 of the one or more spring mechanisms 6/8/10 of the female portion 2 to retract and exit the detent area 4 of the male portion 1, thereby releasing the accessory 52 from the device 50.

Figure 9:
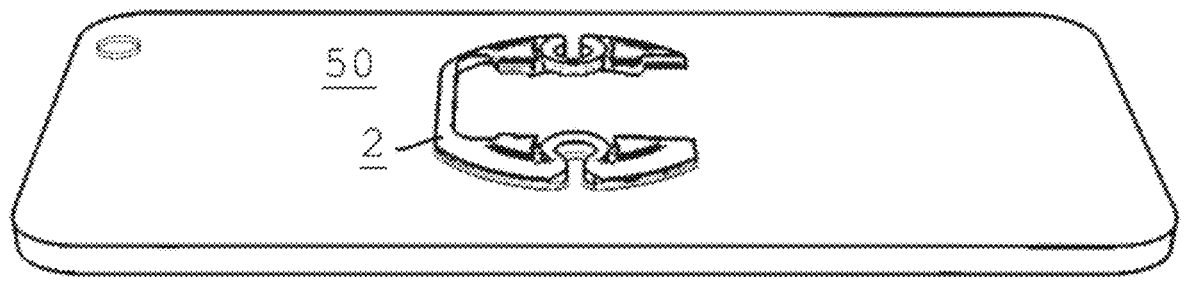
FIG. 9 illustrates a perspective view of a device (or device case) having an integrated female portion.

FIG. 9 illustrates a perspective view of a device 50 (or device case) having an integrated female portion 2. This embodiment is similar to those shown prior except instead of adhering the female portion 2 to the device 50, the female portion 2 is molded into the device 50 or a case made for the device 50.

Figure 10:
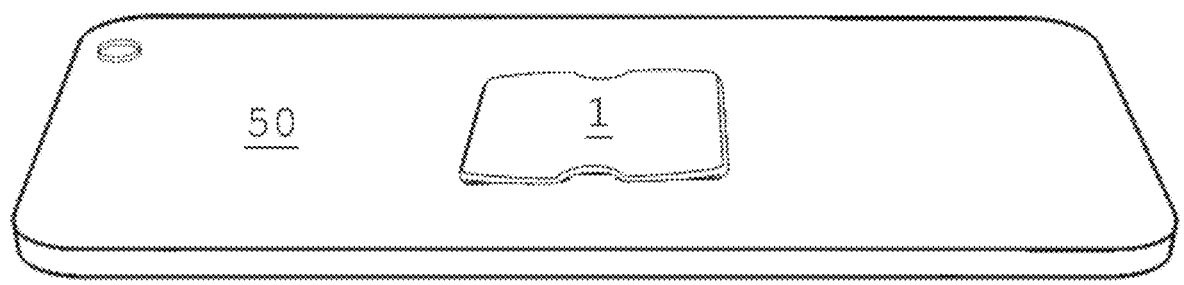
FIG. 10 illustrates a perspective view of a device (or device case) having an integrated male portion.

FIG. 10 illustrates a perspective view of a device 50 (or device case) having an integrated male portion 1. This embodiment is similar to those shown prior except instead of adhering the male portion 1 to the device 50, the male portion 1 is molded into the device 50 or a case made for the device 50.

As is evident from the above description, the disclosed mounting system, including the male portion 1 and female portion 2 is cost effective to manufacture, provides an ultra-thin connection between components (e.g. devices 50 and accessories 52), and has sufficient strength to hold the components together, yet the components are relatively easily slid apart. The amount of force needed to engage and disengage the male portion 1 and female portion 2 is varied during design and manufacture by changing the depth of the center indentation, varying the amount of plastic injected into the flexing arms 10 or the inflection points 8, varying the thickness of the one or more spring mechanisms 6/8/10, angles of surfaces where the extension member 6 interfaces with the detent area 4 (e.g. right angles will be more difficult to release while 45 degree angles will be easier to disengage), etc.

Note that in some embodiments, the male portion 1 and female portion 2 are made/molded of a non-metallic material. In this way, when the device 50 is a cell phone and the accessory is a wireless charger, the wireless charging signal will not be blocked by the combination of the male portion 1 and female portion 2. Further, as many attach a metal disk to the back of a device 50 such as a cellphone (e.g. using adhesive or double-sided tape). In doing so, the metal disk makes it virtually impossible to wirelessly charge the cellphone, as the metal disk blocks or attenuates the charging signal. It is anticipated that the male portion 1 be attached to the metal disk and female portion 2 be attached to the cellphone (or vice versa) so that when charging is needed, the male portion 1 is separated from the female portion 2 so that the metal disk does not interfere with charging.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A mounting system for removably connecting a device to an accessory, the mounting system comprising:
   a male portion having two opposing sides, each of the opposing sides having an edge shelf and at least one of the opposing sides having a detent area;
   a female portion having a top edge, a bottom edge, a front, a back surface, side edges, and a channel formed between two inwardly facing walls of the side edges, each inwardly facing wall having a guide for retaining a corresponding edge shelf of the male portion, and at least one inwardly facing wall having an extension member that is inwardly spring-biased; and whereas upon sliding the male portion into the channel of the female portion, the extension member of the female portion moves into the detent area of the male portion, thereby holding the male portion within the female portion until acted upon by a force of sliding the male portion out of the channel of the female portion.

2. The mounting system of claim 1, the female portion further comprising a stop on the top edge, the stop for preventing the male portion from exiting the female portion at the top edge of the female portion.

3. The mounting system of claim 1, wherein the female portion is affixed to the device by two-sided tape applied to the back surface.

4. The mounting system of claim 1, wherein the male portion is affixed to the device by two-sided tape.

5. The mounting system of claim 1, wherein the female portion is affixed to the accessory by two-sided tape applied to the back surface.

6. The mounting system of claim 1, wherein the male portion is affixed to the accessory by two-sided tape.

7. The mounting system of claim 1, wherein the female portion is formed on a surface of the device.

8. The mounting system of claim 1, wherein the male portion is formed on a surface of the device.

9. The mounting system of claim 1, wherein the extension member is inwardly spring-biased by a spring that is molded as part of the female portion, the spring having flexing arms that interface to the female portion at inflection points.

10. A mounting system for removably connecting a device to an accessory, the mounting system comprising:
a male portion having two opposing sides, each of the opposing sides having an edge shelf and having a detent area;
a female portion having a top edge, a bottom edge, a front, a back surface, side edges, and a channel formed between two inwardly facing walls of the side edges, each inwardly facing wall having a guide for retaining a corresponding edge shelf of the male portion, and two extension members that are inwardly spring-biased by springs that are molded into the female portion, each of the extension member are interfaced to flexing arms, the flexing arms are interfaced to the female portion at inflection points forming the springs; and
whereas upon sliding the male portion into the channel of the female portion, the extension members of the female portion pushes into the detent areas of the male portion, thereby holding the male portion within the female portion until acted upon by a force of sliding the male portion out of the channel of the female portion.

11. The mounting system of claim 10, the female portion further comprising a stop on the top edge, the stop for preventing the male portion from exiting the female portion at the top edge of the female portion.

12. The mounting system of claim 10, wherein the female portion is affixed to the device by two-sided tape on the back surface.

13. The mounting system of claim 10, wherein the male portion is affixed to the accessory by two-sided tape.

14. The mounting system of claim 10, wherein the female portion is formed on a surface of the device.

15. The mounting system of claim 10, wherein the male portion is formed on a surface of the device.

16. A mounting system for removably connecting a device to an accessory, the mounting system comprising:
a planar male portion having two opposing sides, each of the opposing sides having an edge shelf and having a detent area;
a female portion having a top edge, a bottom edge, a front, a planar back surface, side edges, and a channel formed between two inwardly facing walls of the side edges, each inwardly facing wall having a guide for retaining a corresponding edge shelf of the male portion, and each inwardly facing wall having an extension member that is interfaced to flexing arms, the flexing arms are interfaced to the female portion at inflection points, a stop on the top edge of the female portion for preventing the male portion from exiting the female portion at the top edge of the female portion; and
whereas upon sliding the male portion into the channel of the female portion, the extension members of the female portion pushes into the detent areas of the male portion by way of bias provided by the flexing arms, thereby holding the male portion within the female portion until acted upon by a force of sliding the male portion out of the channel of the female portion.

17. The mounting system of claim 16, wherein the planar back surface of the female portion is affixed to the device by two-sided tape.

18. The mounting system of claim 16, wherein the male portion is affixed to the accessory by two-sided tape.

19. The mounting system of claim 16, wherein the female portion is formed on a back surface of the device.

20. The mounting system of claim 16, wherein the male portion is formed on a back surface of the device.

* * * * *